United States Patent [19]
Guichard et al.

[11] Patent Number: 5,508,662
[45] Date of Patent: Apr. 16, 1996

[54] VARIABLE FREQUENCY INDUCTIVE PROXIMITY SENSOR

[75] Inventors: Christophe Guichard, Angouleme; Didier Leonard, Moulidars, both of France

[73] Assignee: Schneider Electric SA, Boulogne-Billancourt, France

[21] Appl. No.: 416,230

[22] Filed: Apr. 4, 1995

[30] Foreign Application Priority Data

Apr. 18, 1994 [FR] France ................... 94 04701

[51] Int. Cl.$^6$ ....................................... G01V 3/11
[52] U.S. Cl. ............... 331/65; 324/207.16; 324/236; 324/327
[58] Field of Search ............... 331/65; 324/327, 324/207.15, 207.16, 207.17, 236

[56] References Cited

U.S. PATENT DOCUMENTS 3,848,243  11/1974  Schirmer ................... 340/280
4,731,591  3/1988  Weigand ................... 331/65

FOREIGN PATENT DOCUMENTS 2281578  3/1976  France .

Primary Examiner—Siegfried H. Grimm
Attorney, Agent, or Firm—Oblon, Spivak, McClelland, Maier & Neustadt

[57] ABSTRACT

A proximity sensor includes a coil for sensing metal objects which are part of an oscillatory circuit and an oscillator which drives the oscillatory circuit at a constant frequency. A tuning device is connected in parallel with the oscillatory circuit. The tuning device is a variable gain amplifier with feedback via an inductive or capacitive impedance.

2 Claims, 1 Drawing Sheet

VARIABLE FREQUENCY INDUCTIVE PROXIMITY SENSOR

BACKGROUND OF THE INVENTION

1. Field of the Invention

The present invention concerns an inductive proximity sensor of the type including a coil for sensing metal objects forming part of an oscillatory circuit, an oscillator driving the oscillatory circuit at a constant frequency, a circuit for processing the signal generated by the oscillatory circuit, an output circuit and a device for tuning the frequency of the oscillatory circuit to the frequency of the oscillator.

2. Description of the Prior Art

The signal generated by oscillatory circuit varies according to the distance of a metal object. In a sensor of this kind it is desirable to tune the frequency of the oscillatory circuit to that of the oscillator, to improve the sensitivity of the sensor. If the natural frequency of the oscillatory circuit is varied by varying the capacitance in this circuit the range of adjustment is limited by the fact that the components currently available—variable capacitors and variable capacitance semiconductor diodes—currently offer only a small range of variation, in the order of a few hundred pF. The frequency change that can be obtained is therefore very small, unless extremely large capacitors are used.

A frequency divider can be inserted between the oscillator and the oscillatory circuit. In this case, however, the resulting flexibility is inversely proportional to the required accuracy of adjustment. Also, to obtain the required range of adjustment a very high frequency must be used, and therefore very fast components; the resulting implementation cost is therefore high.

An object of the invention is to remedy these drawbacks by employing a simple solution to obtain a wide range of adjustment, well suited to inductive proximity sensors.

SUMMARY OF THE INVENTION

The invention consists in an inductive proximity sensor including a coil for sensing metal objects forming part of an oscillatory circuit, an oscillator driving said oscillatory circuit at a constant frequency, a circuit for processing the signal generated by said oscillatory circuit, an output circuit including amplification means and a device for tuning the frequency of said oscillatory circuit to the frequency of said oscillator, in which proximity sensor:

said tuning device is an amplifier in parallel with said oscillatory circuit and adapted to receive on one input the voltage signal of the latter, and said tuning amplifier has its output looped to its input via an inductive or capacitive impedance and has gain varying means for tuning the frequency of said oscillatory circuit to that of said oscillator.

The voltage signal of said oscillatory circuit is preferably applied to an input of the parallel tuning amplifier via a voltage follower stage.

The proximity sensor can therefore be calibrated easily by varying a resistor in a simple circuit well suited to the sensor. Also, the variation in the impedance of the tuning device, as seen from the input, can be a multiple of the reactive feedback impedance.

One embodiment of the invention will now be described with reference to the appended drawings.

DETAILED DESCRIPTION OF THE PREFERRED EMBODIMENT

Figure 1:
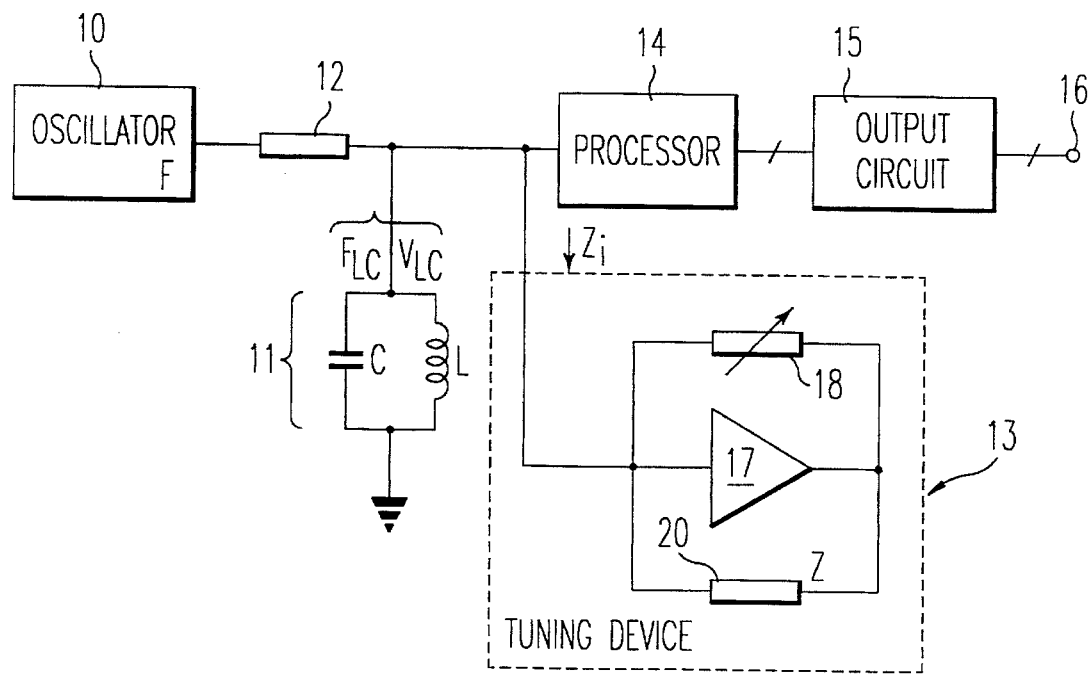
FIG. 1 is a block diagram of a proximity sensor equipped with the tuning device of the invention.

The proximity sensor shown in FIG. 1 is of the inductive type and includes an oscillator 10 oscillating at a fixed frequency F determined by a quartz crystal or a ceramic resonator, for example, and an oscillatory (resonant) circuit 11 with a natural frequency $F_{LC}$ comprising a capacitor C and an inductor L connected in parallel. One terminal of the oscillatory circuit is connected to the oscillator via a decoupling impedance 12, to a tuning device 13 and to a circuit 14 for processing the signal generated by the oscillatory circuit; the latter drives an output circuit 15 which can be connected to a power supply (AC line voltage) and to a load via connecting terminals 16; the circuits 14 and/or 15 include appropriate amplification means.

If a metal object approaches the coil L of the oscillatory circuit the sinusoidal signal (voltage $V_{LC}$) generated by it is modified and the circuits 14 and 15 respond to such modification by connecting or disconnecting the power supply to the load. The purpose of the tuning device 13 is to enable variation of the frequency $F_{LC}$ of the oscillatory circuit signal until it is equal to the frequency F or to a particular value close enough to the frequency F to give the sensor the required sensitivity.

The tuning device 13 is in parallel with the oscillatory circuit and includes (FIG. 1) an inverting linear amplifier 17 with gain control means 18 and its output looped to its input through an inductive or capacitive impedance 20. It can easily be shown that, because of the Miller effect:

$$Z_i = \frac{Z}{1-A}$$

$Z_i$ denotes the input impedance of the device 13, Z denotes the value of the impedance 20 and A is the variable voltage gain of the amplifier. If the impedance 20 is a capacitor C', the input capacitance $C_i$ of the tuning device 13 is equal to (1-A).C' and the tuning device operates as a capacitance multiplier. If this impedance is an inductance L', the input inductance $L_i$ is equal to $$\frac{L'}{1-A}$$

and the device operates as an inductance divider.

Because the gain A can be varied by the adjustment means 18, which is merely a resistor, for example, the parallel impedance $Z_i$ is variable and enables the frequency $F_{LC}$ of the oscillatory circuit to be adjusted to the required value.

Figure 2:
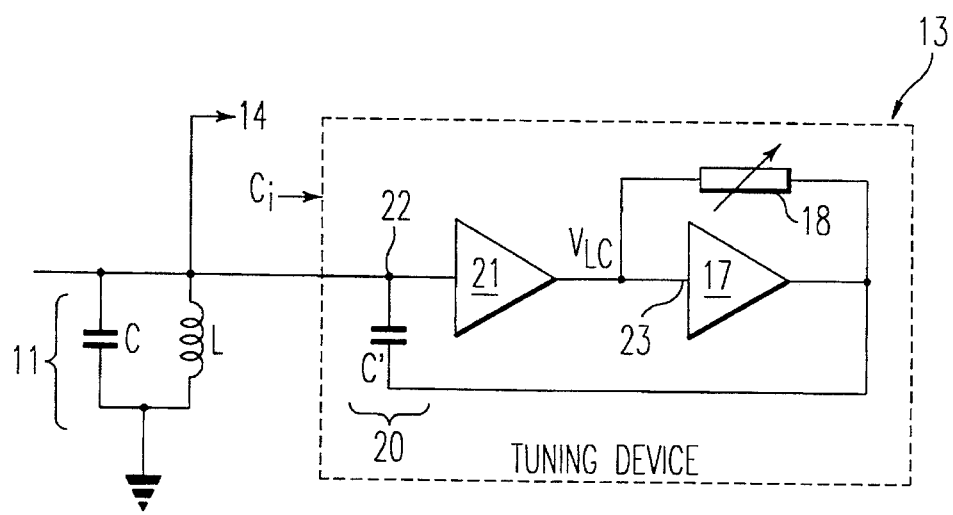
FIG. 2 shows one embodiment of the tuning device.

FIG. 2 shows one embodiment of the tuning device. The impedance associated with the amplifier is a capacitance C', simpler to fabricate and integrate than an inductor, with the value $C_i = (1-A).C'$, as seen from the oscillatory circuit. A voltage follower stage 21 is connected between one side 22 of the capacitance C' and the input 23 of the inverting linear amplifier 17. This follower stage, which may comprise any known circuit, prevents deterioration in the Q of the oscillatory circuit $L_C$ as the input impedance of the amplifier 17 increases whilst retaining substantially unchanged the value $V_{LC}$ of the signal generated by the oscillatory circuit. The value of the capacitance C' and the range of adjustment of the gain A depend on the range and resolution of adjustment required.

Tuning the frequency of the oscillatory circuit is therefore very flexible; the adjustment can be very accurate and stable given the very high gain of the operational amplifier and the use of low-drift components (resistor and capacitor); these components are entirely conventional and easy to integrate. The resulting range of variation is very wide; because the feedback capacitance is relatively high, for example in the order of 1 nF, because the circuit operates at a relatively low frequency, the capacitance $C_i$ as seen from the input, which is a multiple of the feedback capacitance, can vary from zero to several hundred nF. The amplifier, described as an operational amplifier, can equally well be a transistor amplifier.

There is claimed:

1. Inductive proximity sensor including a coil for sensing metal objects forming part of an oscillatory circuit, an oscillator driving said oscillatory circuit at a constant frequency, a circuit for processing the signal generated by said oscillatory circuit, an output circuit including amplification means and a device for tuning the frequency of said oscillatory circuit to the frequency of said oscillator, in which proximity sensor:

said tuning device is an amplifier in parallel with said oscillatory circuit and adapted to receive on one input the voltage signal of the latter, and said tuning amplifier has its output looped to its input via an inductive or capacitive impedance and has gain varying means for tuning the frequency of said oscillatory circuit to that of said oscillator.

2. Proximity sensor according to claim 1 wherein said voltage signal of said oscillatory circuit is applied to an input of said tuning amplifier via a voltage follower stage.

* * * * *